United States Patent [19]

Cooley

[11] Patent Number: 4,505,768
[45] Date of Patent: Mar. 19, 1985

[54] METHOD OF MAKING A DECORATIVE HEAT RESISTANT LAMINATE

[75] Inventor: James Cooley, Orangeburg, S.C.

[73] Assignee: Champion International Corporation, Stamford, Conn.

[21] Appl. No.: 632,058

[22] Filed: Jul. 18, 1984

Related U.S. Application Data

[60] Continuation-in-part of Ser. No. 601,663, Apr. 18, 1984, abandoned, which is a division of Ser. No. 544,774, Oct. 4, 1983.

[51] Int. Cl.³ .............................................. B32B 31/12
[52] U.S. Cl. ................................. 156/153; 156/275.5; 156/278; 156/307.4; 156/320; 156/331.4; 427/34; 428/164; 428/920
[58] Field of Search ............. 156/150, 151, 153, 307.4, 156/331.4, 331.7, 320, 275.5, 278; 427/34, 250, 254; 428/67, 68, 70, 76, 141, 142, 147, 160, 161, 164, 172, 195, 464, 920

[56] References Cited

U.S. PATENT DOCUMENTS

| 3,476,585 | 11/1969 | Fraser et al. ..................... 428/460 X |
| 3,900,644 | 8/1975 | Sackoff et al. ................... 428/215 X |
| 3,932,143 | 1/1976 | Marshall et al. ................ 428/464 X |
| 4,101,698 | 7/1978 | Dunning et al. ................ 156/230 X |
| 4,272,581 | 6/1981 | Cooley et al. ......................... 428/328 |
| 4,330,575 | 5/1982 | Litchfield et al. .............. 428/328 X |
| 4,349,402 | 9/1982 | Parker .............................. 156/151 X |
| 4,407,881 | 10/1983 | Shima et al. ......................... 428/156 |

Primary Examiner—Robert Dawson
Attorney, Agent, or Firm—Evelyn M. Sommer; William W. Jones

[57] ABSTRACT

A heat resistant decorative laminate panel and a process for forming the same are provided. The panel includes a wood substrate to which a discontinuous layer of molten metal is applied by a plasma arc spray apparatus. An isocyanate layer is applied over the metal and extends through the discontinuities to the substrate to both anchor the metal to the substrate and to provide a surface for accepting the decorative layer. The decorative layer then is adhesively applied and subsequent top coat layers are applied. The final top coat preferably is a photocurable material.

8 Claims, 3 Drawing Figures

METHOD OF MAKING A DECORATIVE HEAT RESISTANT LAMINATE

BACKGROUND OF THE INVENTION

This is a continuation-in-part of application Ser. No. 601,663 filed Apr. 18, 1984, now abandoned, which is in turn a divisional of application Ser. No. 544,774 filed Oct. 4, 1983.

Considerable market demand exists for a decorative laminate structure which can withstand moderate to severe heat. For example, heat resistant decorative laminates could be used as kitchen counter tops, laboratory tables, desks, and other similar work surfaces. The surface of these decorative laminates desirably should be able to withstand the heat of objects removed from an oven or open flame, as well as burning cigarettes, cigars and matches. In addition to providing the desired decor and heat resistivity, the subject decorative laminate also should provide the necessary structural integrity for the work surface and should be available at a cost competitive with other decorative laminates.

In response to the potential market demand, a considerable amount of research and development work has been devoted to developing a decorative laminate with the above described characteristics. Several structures have been developed which incorporate a layer of aluminum intermediate the substrate and the decorative laminate layer. The aluminum layer in this structure is intended to rapidly dissipate heat placed on the surface of the laminate, thereby avoiding damage or discoloration to the structure. Although decorative laminates of this type are theoretically feasible, they have proved difficult and uneconomical to manufacture. Specifically, there are many technical problems associated with gluing the aluminum foil layer to the substrate, and then gluing the decorative laminate to the foil. Even if the technical problems can be overcome, the product must be run along a first production line to adhere the foil to the substrate and then along a second production line to adhere the decorative laminate to the foil. The manufacturing process is both time consuming and costly.

U.S. Pat. No. 4,272,581, which issued to Cooley el al. on June 9, 1981 and which is assigned to the assignee of the subject invention, is directed to a heat resistant decorative laminate where a substrate member is directly adhered to a decorative plastic film by an adhesive having aluminum powder dispersed therein. The aluminum powder, which comprises about ten to fifteen weight percent of the total adhesive mixture, contributes to heat dispersion. The decorative plastic film of the laminate described in U.S. Pat. No. 4,272,581 preferably is over-coated with a layer of clear material which further protects the resultant product. The decorative laminate disclosed in U.S. Pat. No. 4,272,581 provides economic advantages in that the heat dissipating aluminum and the adhesive for the decorative layer can be applied in a single application. Although the above described product performs well in many temperature ranges, it is desired to provide a product with an improved ability to resist moderate to extreme heat.

U.S. Pat. No. 3,476,585 which issued to Fraser et al. is directed to the metal coating of wood substrates with an improved adhesion between the wood substrate and the metal. More particularly, the wood is first coated with a mixture of phenol formaldyhde and epichlorohydrin polyamide resin. The resin is allowed to dry on the wood prior to coating the wood with the metal. A metal layer of bronze, steel, aluminum, copper, nickel, chromium or zinc then is applied over the coated wood by oxyacetylene flame spraying. Although this reference may provide enhanced adhesion, the metal coating process would appear to require at least as much production time as the previously described prior art procedures. U.S. Pat. No. 3,476,585 suggests that the metal coating is continuous and does not suggest the application of subsequent coating, such as decorative laminates on top of the metal.

A similar metallic coating technique is described in U.S. Pat. No. 4,330,575 which issued to Litchfield et al. In this latter patent, however, the coating material is an admixture of 20 to 40% by volume of particles of a nickel base alloy or cobalt base alloy, each containing chromium and aluminum, with the balance of the admixture being hollow glass particles which are coated with a nickel base alloy or cobalt base alloy containing chromium or aluminum. This coating admixture, as described in U.S. Pat. No. 4,330,575, is applied to certain parts of gas turbines by plasma spraying techniques to provide a thermal barrier which is resistant to conditions of oxidation and thermal shock. U.S. Pat. No. 4,330,575 does not suggest application of the coating material to a wood substrate. Additionally, this reference only is directed to a coating mixture containing the nickel or cobalt base alloys and coated hollow glass particles. The reference does not suggest a decorative laminate for a wood substrate including metallic layers applied by plasma arc spraying techniques.

A metal coating on wood also is shown by U.S. Pat. No. 3,932,143 which issued to Marshall et al. More particularly, U.S. Pat. No. 3,932,143 is directed to a wood base roofing material which is coated with at least one continuous metallic layer to prevent decay and to resist flame. The one or more metallic layers, as described in U.S. Pat. No. 3,932,143, are applied by flame spraying techniques. This reference does not suggest additional layers to create a decorative heat resistant laminate.

U.S. Pat. No. 4,101,698, which issued to Dunning et al. is directed to a transfer laminate for use in bumpers of automobiles. The laminate shown in U.S. Pat. No. 4,101,698 includes a microscopically discontinuous layer of metal applied by vacuum deposition to an elastomeric film. The reference, however, does not suggest the application of discontinuous metallic layers to wood substrates to improve heat resistivity.

In view of the above, it is an object of the subject invention to provide a decorative laminate on a wood or wood by product substrate with an enhanced ability to resist heat.

It is another object of the subject invention to provide a heat resistant decorative laminate which overcomes the adhesion problems typically encountered in adhering a metallic foil layer to a wood substrate.

It is an object of the subject invention to provide a heat resistant decorative laminate which overcomes the problems of adhering the decorative layer to a metallic layer for dissipating heat.

It is a further object of the subject invention to provide a heat resistant decorative laminate with a metallic layer which can be manufactured efficiently and at a low cost.

SUMMARY OF THE INVENTION

The decorative laminate of the subject invention includes a wood substrate to which a thin, discontinuous layer of molten aluminum is applied with a plasma arc spray gun. The discontinuous aluminum layer is subsequently coated with an isocyanate which covers the aluminum and penetrates through the discontinuities in the aluminum to the wood substrate, thereby anchoring the aluminum to the substrate. The preferred isocyanate is a polymethylene polyphenyl-isocyanate sold by The Upjohn Company under the trademark PAPI 135. A decorative laminate then is adhesively secured to the isocyanate, and subsequent layers of isocyanate are applied to improve the integrity of the decorative laminate layer. The top coating is a photocurable acrylic material.

The discontinuous aluminum layer in the resulting laminate structure rapidly dissipates heat applied to the panel, thus ensuring high heat resistivity for the panel. Additionally, the penetration of the isocyanate layer through the discontinuities in the aluminum ensures a firm bond between the aluminum and the wood substrate and also facilitates secure placement of the decorative layer.

DETAILED DESCRIPTION OF THE PREFERRED EMBODIMENT

Figure 1:
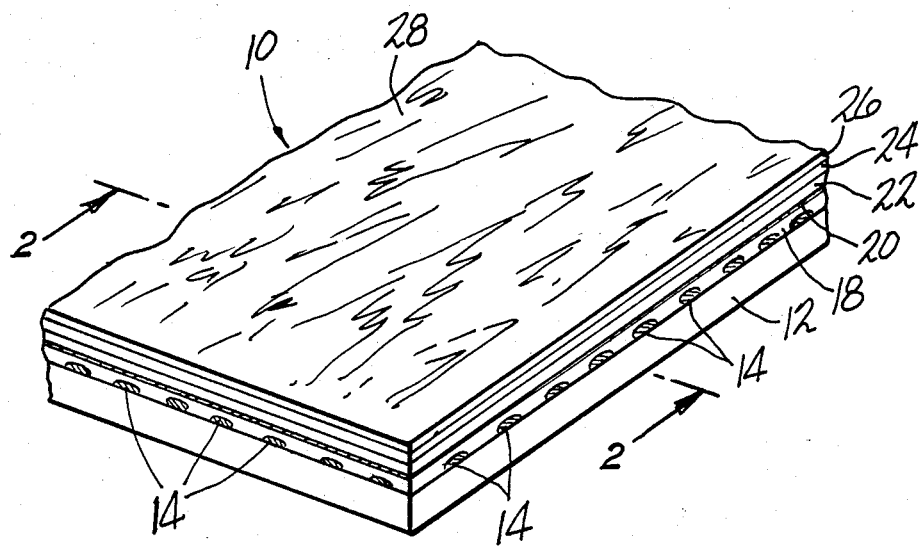
FIG. 1 is a perspective view of a portion of the panel of the subject invention.

The decorative laminate panel of the subject invention is indicated generally by the numeral 10 in FIG. 1. The panel 10 includes a wood substrate 12 which is of a sufficient thickness to provide the required structural support for the panel 10. For example, in most instances, the substrate 12 will be at least one-half inch thick and may be solid wood, laminated wood or wood particle board. The thickness and composition of the substrate 12, of course, will vary according to the use to which the end product will be put.

The wood substrate 12 includes planar surface 13 to which the various layers are applied as explained below. The surface 13 of substrate 12 is prepared for lamination by sanding or planning to eliminate significant discontinuities.

After surface 13 of the wood substrate 12 has been suitably prepared, a layer of aluminum 14 is applied to the substrate 12. The aluminum layer 14 functions as a heat dissipator, and thus provides the desired heat resistivity. As illustrated most clearly in FIG. 2, the aluminum layer 14 is less than continuous across the surface 13 of the wood substrate 12. Specifically, the coverage of surface 13 of the wood substrate 12 by the aluminum 14 preferably is greater than 50% but less than 100%. An 80% coverage of the surface 13 by the aluminum layer 14 is preferred for most applications. The 80% coverage, it has been found, provides adequate heat dissipation for most uses of the panel 10, yet also provides a sufficient number of voids for anchoring the aluminum layer 14 to the substrate 12 as explained herein. Additionally, the aluminum layer 14 can vary from 0.5 mils to 10.0, with 2.0 mils being the preferred thickness. As explained further below, the desired thickness and coverage ratio of aluminum layer 14 is achieved economically and efficiently by a plasma arc spray apparatus, such that the aluminum is liquified and is applied as a spray of tiny droplets at a high velocity.

The aluminum layer 14 is securely adhered to the wood substrate 12 by a layer 18 of isocyanate. The isocyanate layer 18 is applied at a sufficient rate to substantially penetrate through the discontinuities in the aluminum layer 14 and to provide a coating layer of from 1.0 mils to 5.0 mils wet over the aluminum layer 14. Preferably this layer of isocyanate is 2.0 mils thick. The layer 18 may comprise either undiluted isocyanate or isocyanate diluted with toluene. The preferred dilution is 10% by weight of isocyanate in toluene.

One or more layers of adhesive 20 subsequently are applied to the isocyanate layer 18. The decorative laminate 22 then is applied to the adhesive layer 20 to provide a complete decorative layer across the panel 10.

After the decorative laminate layer 22 has been suitably trimmed and cleaned, as explained further below, a second layer 24 of isocyanate is applied to the decorative laminate layer 22. The second isocyanate layer 24 is allowed to penetrate for a desired period of time and then is dried. A final coating 26 of a photocurable material then is applied over the isocyanate, and this final coating 26 is cured in a UV processor or other similar apparatus.

The outer planar surface 28 of the final coating 26 defines the surface of the panel 10 which would be subjected periodically to moderate heat. Heat applied to surface 28 would be transmitted through the various layers of panel 10 but would be rapidly dispersed by the discontinuous aluminum layer 14. Thus, heat applied to the surface 28 of the panel 10 will not discolor the decorative layer 22 or the layer 24 or 26 applied over the decorative layer 22.

Figure 2:
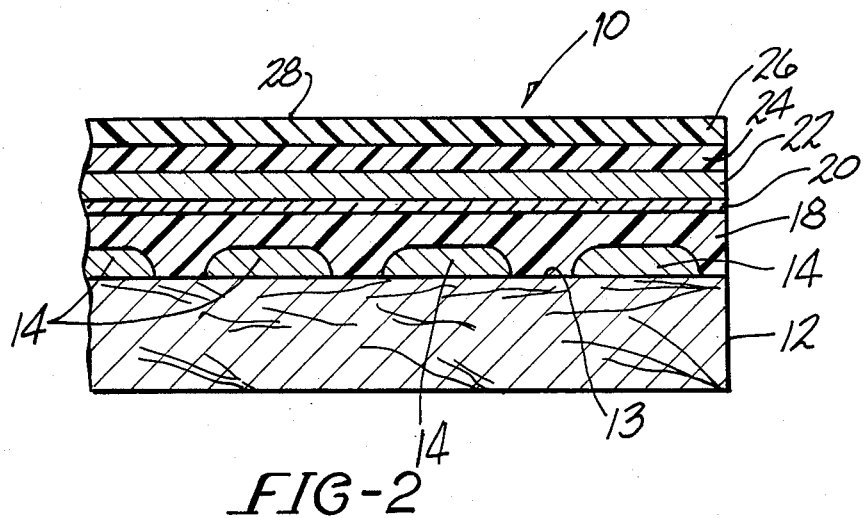
FIG. 2 is a cross-sectional view taken along line 2—2 in FIG. 1.
Figure 3:
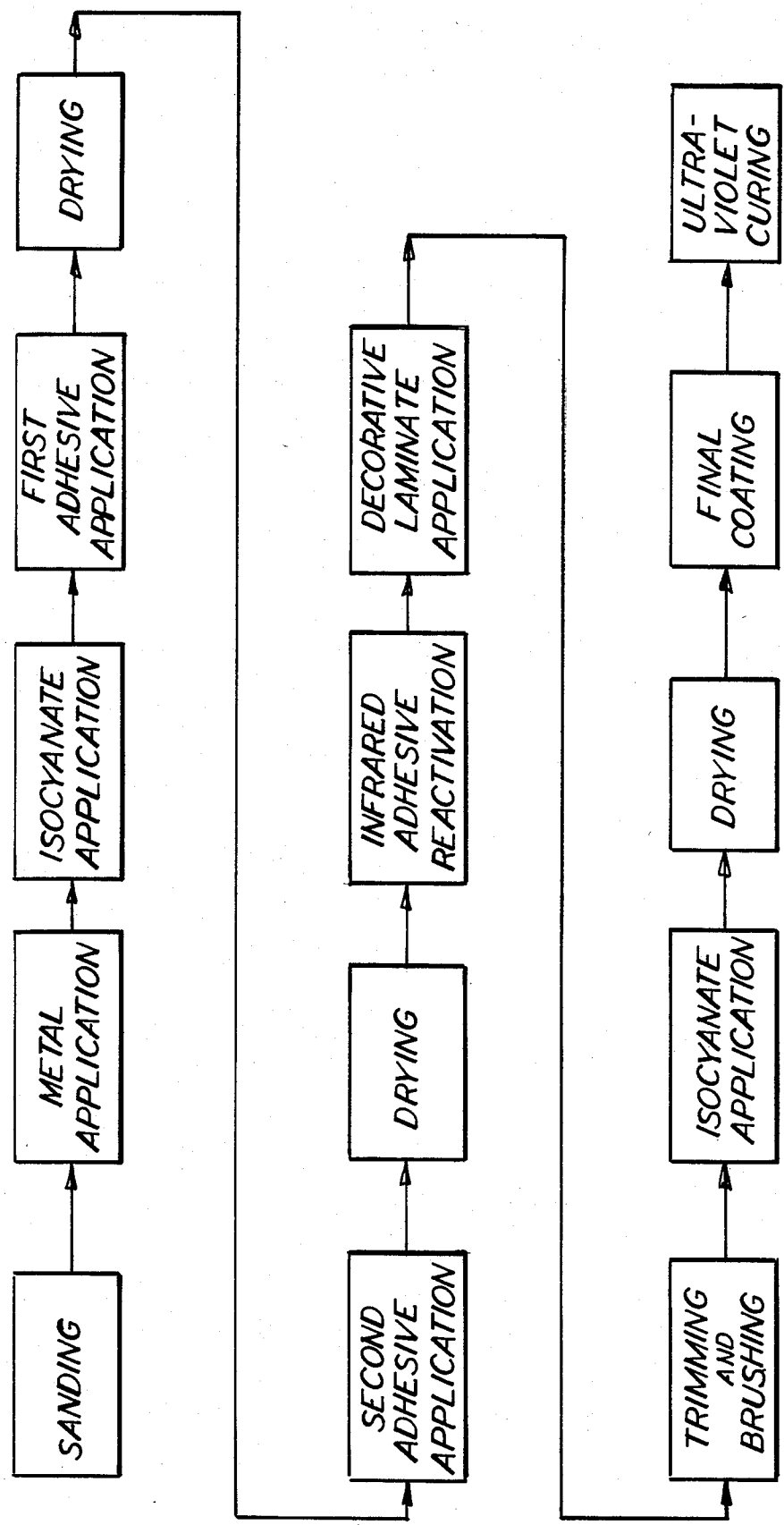
FIG. 3 is a block diagram showing the steps of the process of the subject invention.

Turning to FIG. 3, the preferred process for forming the panel of FIGS. 1 and 2 is illustrated schematically. As noted previously and as shown in FIG. 3, the surface of the wood substrate is prepared for coating by sanding to eliminate any substantial discontinuities.

After appropriate sanding and cleaning, a thin discontinuous layer of molten aluminum is applied with a plasma arc spray gun. This layer defines a discontinuous film, the thickness of which can vary from 0.5 mils to 10.0 mils with a preferred thickness of 2.0 mils. In operation, the plasma arc equipment directs aluminum into an ionization chamber where it is heated and brought to a liquid state. The liquid aluminum then is dispersed into tiny droplets with a high velocity stream of hot helium. The helium also transports the molten aluminum to the substrate surface. As noted above, the aluminum layer which is indicated by the numeral 14 in FIG. 2 should be less than continuous, but, should cover at least 50% of the surface 13 of the substrate 12. In the preferred embodiment, the aluminum layer covers approximately 80% of surface of the substrate. This coverage ratio assures desirable levels of heat dissipation and bonding.

Returning to FIG. 3, isocyanate is applied over the aluminum and the discontinuities therein. The rate of application of isocyanate should be sufficient to provide a 1.0 to 5.0 mils wet layer over the aluminum, with 2.0 mils wet being preferred. As noted previously, the isocyanate coating applied over the aluminum preferably should comprise a solution with 10% by weight of isocyanate in toluene. No oven drying of the isocyanate is required at this stage.

As illustrated schematically in FIG. 3, the adhesive preferably is applied in two stages with a drying step occurring after each application. More particularly, the first adhesive application is at a rate of 1.0 to 5.0 grams per square foot of adhesive on a dry weight basis with approximately 2.0 grams per square foot being preferred. The adhesive may be urethane, polyester, epoxy, acrylic, polyvinyl acetate or ethylene vinyl acetate. The preferred adhesive is ethylene vinyl acetate.

After application of the adhesive as described above, the panel is passed through a high velocity oven at 120° F. to 130° F. for a period of 8 to 10 seconds.

A second coat of adhesive is applied over the first dry coat. Preferably, the second coat is of the same type as the first coat and is applied at approximately the same rate. This second coat is then dried. However, it is preferred that the second high velocity oven be maintained at a slightly higher temperature and, preferably, at a temperature range of 130° F. to 150° F.

The dried adhesive is prepared for application of the decorative laminate by passing the partially completed panel through a zone of intense infrared to a surface temperature of between 160° F. and 200° F. This heat reactivation of the dried adhesive prepares the panel for application of the decorative laminate.

The decorative laminate preferably is rolled onto the heat reactivated adhesive with a rotary press. The rotary press apparatus aligns the decorative laminate and applies pressure to ensure that the decorative laminate is securely adhered to the panel. The partially completed panel then is edge trimmed and end trimmed and is appropriately brushed free of dust prior to top coating.

The first top coating over the decorative laminate is isocyanate. This isocyanate top coating thickness may vary from 1.5 to 3.0 mils wet with a preferred thickness of 2.0 mils wet. Additionally, the isocyanate top coating may have an isocyanate concentration range of between 1% by weight in toluene to undiluted isocyanate. The preferred isocyanate coating comprises 10% isocyanate by weight in toluene. The liquid isocyanate coating is allowed to penetrate into the decorative laminate for a period of time varying from 0.1 seconds to 5 minutes. In the preferred process, the isocyanate coating is allowed to penetrate for 2.0 seconds. After a suitable period of penetrating, the panel is passed through a high velocity oven to dry the isocyanate coating. The oven temperature preferably is between 120° F. and 380° F. with a preferred oven temperature of 280° F. The exposure time in this oven is between 8 and 15 seconds.

A final coating is applied over the dried first top coating of isocyanate. This final top coating comprises a photocurable material applied at the rate of 0.2 mils to 5.0 mils wet with a preferred film thickness of 2.0 mils wet. The panel thus coated is then passed through an ultraviolet processor where the layer of photocurable material is cured. The exposure time in the UV processor can range between 5 to 15 seconds with 12 seconds being preferable. The preferred coating type for this final top coating is a photocurable acrylic. However, polyesters, epoxies, urethanes, alkyds, and vinyl solutions may be used for the final top coating in place of the photocurable acrylic. After this photocuring of the final top coating is complete, the resultant panel is ready for packaging, shipping and use.

In summary, a decorative laminate and process are provided wherein the panel comprises a wood substrate with a discontinuous layer of molten aluminum applied to the wood substrate with a plasma arc spray apparatus. A layer of isocyanate solution then is applied to the panel to both cover the aluminum and to penetrate through the discontinuities in the aluminum to the wood substrate. In this manner, the isocyanate solution firmly bonds the aluminum layer to the wood substrate. One or more layers of adhesive then are applied over the isocyanate and then an appropriate decorative laminate layer is firmly secured to the panel. Top coatings of an isocyanate solution and a photocurable material then are applied to the panel successively with appropriate drying and/or curing steps after each application. The resultant panel is both decorative and heat resistant, with the aluminum layer acting to rapidly dissipate heat.

While the preferred embodiment of the subject invention has been described and illustrated, it is obvious that various changes and modifications can be made therein without departing from the spirit of the present invention which should be limited only by the scope of the appended claims.

What is claimed is:

1. A method for forming a heat resistant decorative laminate comprising the steps of:
    providing a wood substrate having at least one planar surface;
    applying a discontinuous layer of molten metal with a plasma arc spray apparatus onto the planar surface of said wood substrate to cover more than 50% but less than 100% of said surface;
    applying 1.0 to 5.0 mils wet of an isocyanate solution over the discontinuous metal layer, with the isocyanate solution penetrating into the discontinuities in said metal layer and contacting the wood substrate at said discontinuities;
    applying at least one layer of adhesive over said isocyanate layer; and
    applying a decorative laminate layer to said adhesive.

2. A method as in claim 1 further including the steps of drying said adhesive and heat reactivating said adhesive prior to applying the decorative laminate.

3. A method as in claim 1 further including the step of sanding the planar surface of said wood substrate prior to applying the layer of metal.

4. A method as in claim 1 wherein said molten metal covers approximately 80% of said surface of said wood substrate.

5. A method as in claim 4 wherein the metal is aluminum.

6. A method as in claim 1 wherein the isocyanate solution comprises approximately 10% by weight of polymethylene polyphenyl isocyanate in toluene.

7. A method as in claim 1 comprising the further step of applying a top coat of photocurable material, said top coat overlying said decorative laminate.

8. A method as in claim 7 further including the step of passing said panel through a UV processor after application of said photocurable material.

* * * * *